May 5, 1936.  W. E. LINCOLN  2,039,486

EGG CRATE FILLER

Original Filed May 19, 1932

Inventor:
Walter E. Lincoln
By Wilson, Dowell, McCanna & Rehm
Attys.

Patented May 5, 1936

2,039,486

UNITED STATES PATENT OFFICE 2,039,486

EGG CRATE FILLER

Walter E. Lincoln, Belvidere, Ill.

Application May 19, 1932, Serial No. 612,269
Renewed August 22, 1935

12 Claims. (Cl. 217—28)

This invention relates to a new and improved egg crate filler of a form suitable for use also as a carrier and as a holder of a number of eggs for candling the same, a group at a time.

The principal object of my invention is to provide an egg crate filler, the tray sections of which have pockets designed to hold the eggs laid sidewise in the plane of the trays, the pockets furthermore leaving the eggs exposed so that they may be subjected to light passage therethrough, whereby to permit handier, safer, and quicker candling of the eggs, while in place in the filler.

Another object is to make the fillers so that the egg-receiving pockets are in rows but the longitudinal axis of each pocket is anglewise with respect to the line of the row to permit packing the eggs in the manner stated and still get a prescribed number of eggs in each filler made to fit a standard sized crate, the fillers being further made of such thickness that a certain desired number can be placed back to back in a specified sized compartment of a shipping crate, whereby to secure a desired capacity.

A further object is to provide egg crate fillers designed to be placed on end in the crate, whereby they may be conveniently inserted and removed, the individual fillers being further constructed so as to have the eggs laid therein on their side so that when the filler is in its normal position in the crate the eggs are supported on end, as they should be.

Other objects and advantages will appear as the invention is described by reference to the accompanying drawing wherein—

Figure 5:
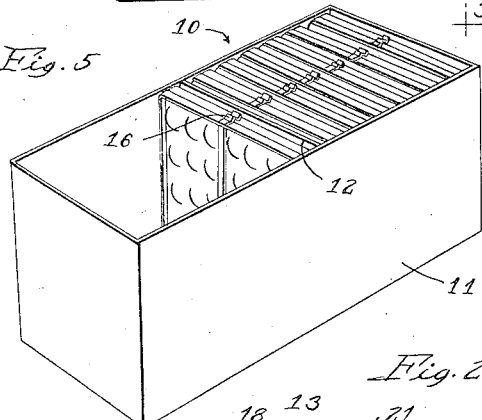
Fig. 5 is a perspective view of an egg crate showing how the fillers are placed therein.

The fillers are indicated generally by the reference numeral 10 in Fig. 5 placed on end in the two compartments of the crate 11, with six fillers on each side of the partition 12, this being a thirty dozen crate, and there being two and one-half dozen eggs in each filler. There are other standard sized crates taking twelve dozens, nine dozens, and six dozens, and it should be understood that fillers may be made in accordance with my invention to fit those crates, the individual filler in that case being made to take a smaller number of eggs.

Figure 4:
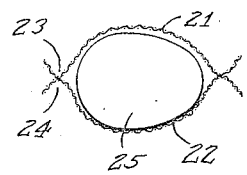
Fig. 4 is a sectional detail on the line 4—4 of Figure 1.

Each filler or tray comprises two tray sections 13 and 14 suitably hinged together at one end, as at 15, and provided with a fastener 16 at the other end to detachably lock the tray sections in closed position. The tray section 13 has a rectangular sheet metal frame 17 in which the edges of a sheet of wire screen are clinched, as appears in Figs. 2 and 3. In like manner, the tray section 14 has a rectangular frame 19 carrying screen 20. The screens 18 and 20 are each preferably in one piece and pressed between suitable dies to provide egg-receiving pockets 21 and 22 of complementary form adapted to register with one another when the tray sections are superimposed in operative relation. The impressions are deepest at the points 23 in the tray section 13 and at the corresponding points 24 in the tray section 14, which come between the ends of the eggs when the sections are superimposed, see Fig. 4. In that way, the one tray section rests on the other with the screen portions in contact at the points 23—24 and all of the egg pockets are separated to positively prevent contact between adjacent eggs. The impressions are purposely made shallower at all other points between pockets so as not to tear the wire fabric of the screens. It will now be seen that the pockets 21—22 are shallow and elongated in a plane parallel with the planes of the tray sections so as to hold the eggs laid sidewise in the sections, instead of on end, whereby, due to the translucency of the screen material used in the tray sections, to permit candling the eggs without removing the same from the filler. This eliminates a lot of unnecessary handling and accordingly cuts down labor cost. It also follows that there is much less danger of loss through breakage. The fact that the trays have such shallow pockets and are moreover no greater in thickness than the over-all thickness through the pocket portions (see Figs. 2 and 3) means minimum waste of space in a crate when the trays are placed therein back to back, and it permits storage of a certain desired number of filled trays in a certain sized compartment of a shipping crate. The shallowness of the pockets 21—22 is, moreover, of advantage because it permits making the tray sections of one-piece wire construction without danger of tearing the screen or placing so much strain thereon in its formation as to render the screen too weak for service. Where screens were made to hold the eggs on end, the depth of the pockets made it impractical to form the trays of one-piece construction and there was, moreover, the objection that the eggs had to be removed for candling, it being impossible to properly candle an egg held endwise. While I disclose tray sections having wire screen as the egg supporting material, it should be evident that this is mainly with a view to permitting candling of the eggs; any other transparent or translucent material could be used, or even opaque material, if perforated or slotted sufficiently to expose enough of each egg for candling. Then too, the material need not be sheet material pressed to the form desired, but might be molded or otherwise brought to the form desired.

Figure 1:
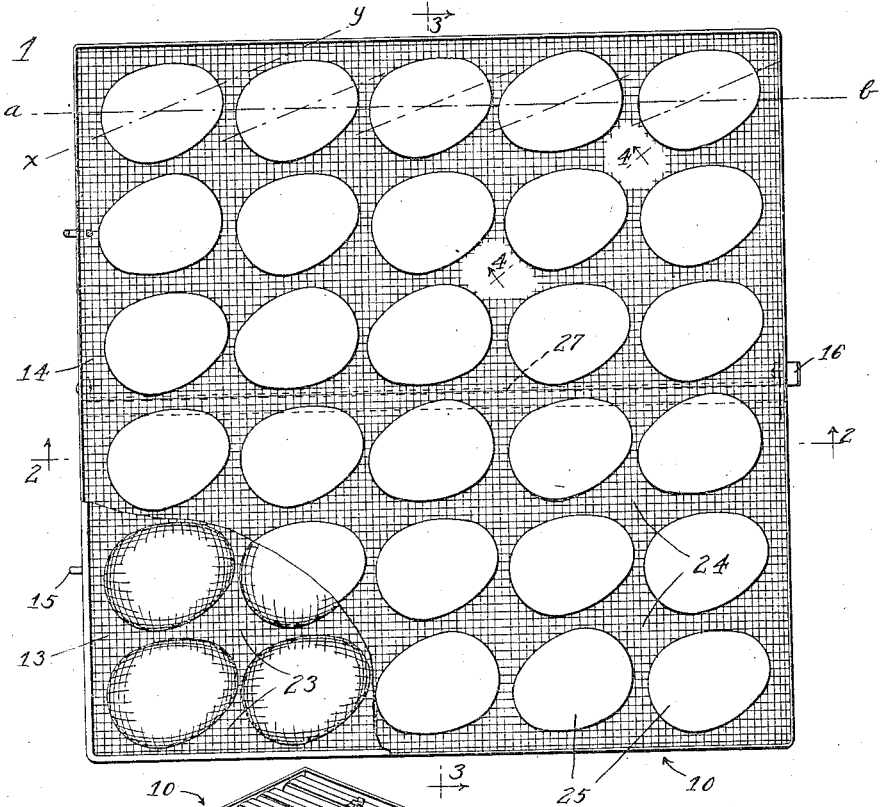
Figure 1 is a plan view of an egg crate filler made in accordance with my invention with a large portion of the upper tray section broken away so as to show the lower tray section with the eggs thereon.

The formation of the pockets 21—22 in the manner stated presented a problem to get a prescribed number of eggs in a filler made to fit a standard sized crate. Where the eggs are packed on end the small diameter makes it an easy matter to get the required spacing. Referring to Figure 1, it will be seen that the pockets are provided in rows lengthwise and crosswise of the trays, one such row being represented by the line a—b. Next, it will be observed that the pockets 21—22 in each of these rows are formed so that the longitudinal axis, designated x—y, is at an acute angle to the line a—b, whereby to offset the ends of the eggs placed in the pockets so as to secure the proper spaced relation between the eggs and avoid any danger of contact therebetween.

Figure 2:
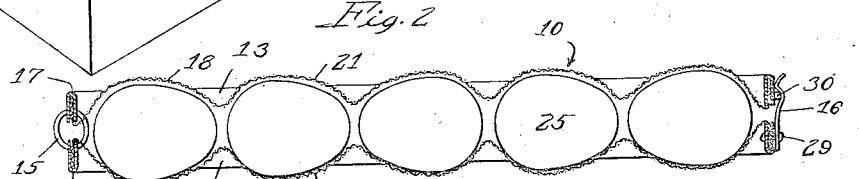
Figs. 2 and 3 are cross-sections on the correspondingly numbered lines of Figure 1.
Figure 3:
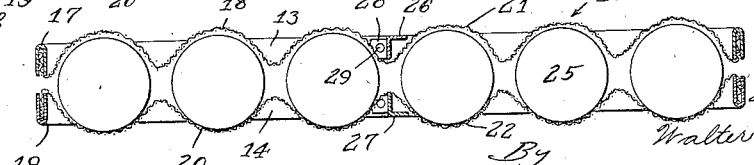

In order to prevent sagging of the screens 18 and 20 I have provided cross-rods 26 and 27 across the middle of the frames 17 and 19, respectively. Each of these cross-rods is suitably of angular cross-section, as appears in Fig. 3, and has a laterally bent lug 28 on each end thereof to permit fastening to the inside of the frames, as by rivets 29. The fastener 16 may, if desired, be fastened in place on the tray section 19 by one of these rivets, as indicated in Figures 1 and 2, whereby to cut down the cost of manufacture. A suitable stud 30 on the frame of the other tray section cooperates with the fastener 16, as indicated in Fig. 2, to lock the tray sections in closed position.

In use, the filler or tray is opened and eggs placed in the pockets of the one tray section, as appears in Fig. 1, whereupon the other tray section is closed thereon and locked. If some of the eggs do not happen to be placed sidewise they can be brought into position by simply jarring the tray section slightly, and when the other tray section is brought down to closed position over the eggs, the eggs are thereby automatically shifted into the exact position desired. Each egg is then caged within yielding material and out of contact with the other eggs so that there is no danger of breakage. Once the eggs are packed in the filler there is no need for disturbing them, inasmuch as they can be candled in place therein, due to the fact that they are all disposed sidewise between the screens. The retailer can also use the fillers as carriers, thereby eliminating further occasion for removing and handling the eggs. The fact that the fillers are stood on end in the crate, as disclosed in Fig. 5, makes it handier to fill the crate and also to remove the individual fillers and replace them. While the eggs are laid on their side in the individual fillers, they are supported on end as they should be when the filler is inserted in the crate. In other words, I have not sacrificed proper support of the eggs in shipment in order to provide an egg crate filler designed to permit candling of the eggs while in place in the filler.

It is believed the foregoing description conveys a good understanding of the objects and advantages of my invention. The appended claims have been drawn with a view to covering all legitimate modifications and adaptations.

I claim:

1. An egg crate filler comprising a pair of companion tray members, each comprising egg-supporting material formed to provide substantially half-depth egg-receiving pockets therein with rectangular connecting webs therebetween, the pockets in the one tray member being complements of those in the other tray member and being adapted to register with one another with the connecting web portions of the trays in direct engagement when the tray members are superimposed on one another in operative relation, the pockets being formed to hold eggs therein laid sidewise, in the plane of the tray members, in proper position for candling while in place in the filler, and said pockets supporting the eggs so that they remain visible from the outside of the filler and may be subjected to light passage therethrough while in place in the pockets.

2. An egg crate filler comprising a pair of companion tray members, each comprising egg-supporting material formed to provide substantially half-depth egg-receiving pockets therein with rectangular connecting webs therebetween, the pockets in the one tray member being complements of those in the other tray member and being adapted to register with one another with the connecting web portions of the trays in direct engagement when the tray members are superimposed on one another in operative relation, the pockets being formed to hold eggs therein laid sidewise, in the plane of the tray members, in proper position for candling while in place in the filler, the pockets being in rows lengthwise and crosswise of the tray members but each pocket having its longitudinal axis at an acute angle to the line of the row, for the purpose described, and said pockets supporting the eggs so that they remain visible from the outside of the filler and may be subjected to light passage therethrough while in place in the pockets.

3. An egg crate filler for use in an egg crate of predetermined dimensions, comprising a pair of companion tray members each comprising a frame of a size to fit in the crate between the side walls thereof, and screen material in said frame formed to provide substantially half-depth egg-receiving pockets of approximately elliptical or egg shape with approximately rectangular connecting webs therebetween, the pockets in the one tray member being complements of those in the other tray member and being adapted to register with one another with the connecting web portions of the trays in direct engagement when the tray members are brought together in operative relationship, the pockets being formed to hold eggs therein with the major axis in the plane of the tray members, so as to be in proper position for candling of the eggs by viewing the same in place in the filler, the elliptical pockets being in rows lengthwise and crosswise of the frames with each pocket having its major axis at an acute angle to the line of the row, so that the over-all length of a row of pockets is longer than the corresponding dimensions of the frame.

4. An egg crate filler adapted for insertion removably into a crate with a plurality of other like fillers, comprising a pair of companion tray members each in turn comprising a rectangular frame of the proper size for insertion in the crate, and egg supporting and spacing means in the frame consisting of a single piece of sheet material, the sheet material being pressed so as to form egg shaped pockets therein with substantially rectangular lands therebetween, whereby when the tray members are superimposed with the pockets in register, the lands support the one tray on the other with the eggs confined in the pockets, the pockets except for those portions thereof adjacent the lands being shallower and only deep enough to provide lateral support for the egg laid therein sidewise, whereby to enable pressing of the sheet material to the form stated without tearing or weakening the material in the forming thereof.

5. An egg carrier and candling tray adapted for shipment with like trays as fillers laid back to back in a shipping crate, each tray comprising two frame sections fastened together and having sheets of stiff, shape-holding material mounted therein having egg receiving pockets formed therein, the frames and pocket portions being approximately of the same over-all thickness so as to minimize waste space in the placing of trays back to back, the pockets being constructed to receive the eggs laid on their sides so that the over-all thickness of the tray is less than the length of an egg placed in any one of said pockets, whereby to permit storage of a certain desired number of filled trays back to back in a certain sized compartment of an egg shipping crate, and said pockets being further constructed so that the eggs remain visible and may be subjected to light passage therethrough while in place on their sides in the pockets, suitable for candling purposes.

6. An egg carrier and candling tray adapted for shipment with like trays as fillers laid back to back in a shipping crate, each tray comprising two frame sections fastened together and having sheets of stiff, shape-holding material mounted therein having egg receiving pockets formed therein, the frames and pocket portions being approximately of the same over-all thickness so as to minimize waste space in the placing of trays back to back, the pockets being constructed to receive the eggs laid on their sides so that the over-all thickness of the tray is less than the length of an egg placed in any one of said pockets, whereby to permit storage of a certain desired number of filled trays back to back in a certain sized compartment of an egg shipping crate, the pockets being in rows with the major axis of each pocket at an acute angle to the line of the row so that the row is shorter in length than the aggregate length of the pockets, whereby to enable placing a proportionately larger number of eggs in each tray, and said pockets being further constructed so that the eggs remain visible and may be subjected to light passage therethrough while in place on their sides in the pockets, suitable for candling purposes.

7. An egg tray adapted for shipment with like trays as fillers laid back to back in a shipping crate, each tray comprising two frame sections fastened together and having sheets of stiff, shape-holding material mounted therein having egg receiving pockets formed therein, the frames and pocket portions being approximately of the same over-all thickness so as to minimize waste space in the placing of trays back to back, and the pockets being constructed to receive the eggs laid on their sides so that the over-all thickness of the tray is less than the length of an egg placed in any one of said pockets, whereby to permit storage of a certain desired number of filled trays back to back in a certain sized compartment of an egg shipping crate.

8. An egg tray adapted for shipment with like trays as fillers laid back to back in a shipping crate, each tray comprising two frame sections fastened together and having sheets of stiff, shape-holding material mounted therein having egg receiving pockets formed therein, the frames and pocket portions being approximately of the same over-all thickness so as to minimize waste space in the placing of trays back to back, the pockets being constructed to receive the eggs laid on their sides so that the over-all thickness of the tray is less than the length of an egg placed in any one of said pockets, whereby to permit storage of a certain desired number of filled trays back to back in a certain sized compartment of an egg shipping crate, and said pockets being in rows with the major axis of each pocket at an acute angle to the line of the row so that the row is shorter in length than the aggregate length of the pockets, whereby to enable placing a proportionately larger number of eggs in each tray.

9. An egg container comprising a pair of companion tray members, each comprising egg-supporting material formed to provide substantially half depth egg-receiving pockets therein, at least one of said tray members having the egg-supporting material formed to provide spacing means between the pockets for engagement with the companion tray member when the tray members are superimposed in operative relation, the pockets in the one tray member being complements of those in the other tray member and being arranged to register with one another when the tray members are superimposed on one another in operative relation, the pockets being formed to hold eggs laid therein on their side in the plane of the tray members so as to permit candling while in place in the pockets, and said pockets supporting the eggs so that they remain visible from the outside of the filler and may be subjected to light passage therethrough while in place in the pockets.

10. An egg container comprising a pair of companion tray members, each comprising egg-supporting material formed to provide substantially half depth egg-receiving pockets therein, at least one of said tray members having the egg-supporting material formed to provide spacing means between the pockets for engagement with the companion tray member when the tray members are superimposed in operative relation, the pockets in the one tray member being complements of those in the other tray member and being arranged to register with one another when the tray members are superimposed on one another in operative relation, the pockets being formed to hold eggs laid therein on their side in the plane of the tray members so as to permit candling while in place in the pockets, the pockets being in rows lengthwise and crosswise of the tray members but each pocket having its longitudinal axis at an acute angle to the line of the row, for the purpose described.

11. An egg crate filler adapted for shipment with other fillers placed on end back to back in a shipping crate, said filler comprising two sections each comprising egg supporting material formed to provide substantially half depth egg-receiving pockets therein, the pockets in the one section being complements of those in the other section and being arranged to register with one another when the sections are in closed operative relation, the pockets being formed to hold eggs laid therein on their side in the plane of the filler, whereby when the filler is placed on end in the crate the eggs are supported on end and the filler is removable from the crate by endwise movement.

12. An egg crate filler as set forth in claim 11, wherein the pockets in the egg-supporting material are in rows lengthwise and crosswise of the filler sections but each pocket has its longitudinal axis at an acute angle to the line of the row, for the purpose described.

WALTER E. LINCOLN.